(12) United States Patent
Bi

(10) Patent No.: US 12,724,705 B2
(45) **Date of Patent: *Sep. 1, 2026**

(54) DATA ORGANIZATION FOR LOGICAL TO PHYSICAL TABLE COMPRESSION

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/897,773

(22) Filed: Sep. 26, 2024

(65) Prior Publication Data

US 2025/0094338 A1 Mar. 20, 2025

Related U.S. Application Data

(63) Continuation of application No. 17/420,210, filed as application No. PCT/CN2021/091817 on May 5, 2021, now Pat. No. 12,124,365.

(51) Int. Cl.

*G06F 12/02* (2006.01)
*G06F 13/16* (2006.01)

(52) U.S. Cl.

CPC ...... *G06F 12/0246* (2013.01); *G06F 13/1668* (2013.01); *G06F 2212/401* (2013.01); *G06F 2212/7201* (2013.01)

(58) Field of Classification Search

None

See application file for complete search history.

(56) References Cited

U.S. PATENT DOCUMENTS 5,926,426 A * 7/1999 Han ..................... G11C 7/1006 365/205
6,233,648 B1 5/2001 Tomita
(Continued)

FOREIGN PATENT DOCUMENTS

CN 102063377 A 5/2011
CN 107015920 A 8/2017
(Continued)

OTHER PUBLICATIONS

International Search Report and Written Opinion received for PCT Patent Application No. PCT/CN2021/091817, mailed on Jan. 30, 2022, 9 pages.

(Continued)

*Primary Examiner* — Elias Mamo

(74) *Attorney, Agent, or Firm* — Holland & Hart LLP

(57) ABSTRACT

Methods, systems, and devices for data organization for logical to physical table compression are described. The memory system may identify a region that includes one or more logical addresses associated with discontinuous corresponding physical addresses. The memory system may include a plurality of regions of logical addresses and a plurality of memory cells arranged according to a plurality of physical addresses. The memory system may determine a period of inactivity of access operations on the plurality of memory cells and rearrange, during the period of inactivity, information stored within the discontinuous corresponding physical addresses to be within continuous physical addresses of the plurality of physical addresses.

20 Claims, 6 Drawing Sheets

(56) References Cited

U.S. PATENT DOCUMENTS

| | | | | |
|---|---|---|---|---|
| 6,542,424 | B2 * | 4/2003 | Endo | G11C 7/065 365/207 |
| 9,965,194 | B2 | 5/2018 | Lin et al. | |
| 9,990,280 | B2 | 6/2018 | Shen | |
| 10,229,051 | B2 * | 3/2019 | Hwang | G06F 12/0246 |
| 11,520,695 | B2 * | 12/2022 | Zilberstein | G06F 3/0616 |
| 11,580,017 | B2 * | 2/2023 | Ke | G06F 12/0246 |
| 2017/0192902 | A1 | 7/2017 | Hwang et al. | |
| 2018/0107619 | A1 | 4/2018 | Singh et al. | |
| 2022/0004341 | A1 * | 1/2022 | Chen | G06F 3/061 |
| 2022/0121379 | A1 | 4/2022 | Byun | |

FOREIGN PATENT DOCUMENTS

| | | | |
|---|---|---|---|
| CN | 107408022 | A | 11/2017 |
| CN | 109671458 | A | 4/2019 |
| CN | 111813710 | A | 10/2020 |
| CN | 111984604 | A | 11/2020 |
| CN | 112148628 | A | 12/2020 |
| WO | 2017/212515 | A1 | 12/2017 |

OTHER PUBLICATIONS

Chinese patent office, "China Office Action," issued in connection with China Patent Application No. 202180006261.2 dated Jun. 18, 2025 (18 pages) (8 pages of English Translation and 10 pages of Original Document).

Hahn, S. S., et al., "Improving file system performance of mobile storage systems using a decoupled defragmenter.", USENIX Annual Technical Conference, 2017, pp. 759-771.

* cited by examiner

500

DATA ORGANIZATION FOR LOGICAL TO PHYSICAL TABLE COMPRESSION

CROSS REFERENCE

The present Application for Patent is a continuation of U.S. patent application Ser. No. 17/420,210 by Bi, entitled "DATA ORGANIZATION FOR LOGICAL TO PHYSICAL TABLE COMPRESSION," filed Jul. 1, 2021, which is a 371 national phase filing of International Patent Application No. PCT/CN2021/091817 by Bi., entitled "DATA ORGANIZATION FOR LOGICAL TO PHYSICAL TABLE COMPRESSION," filed May 5, 2021, each of which is assigned to the assignee hereof, and each of which is expressly incorporated by reference in its entirety herein.

FIELD OF TECHNOLOGY

The following relates generally to one or more systems for memory and more specifically to data organization for logical to physical table compression.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
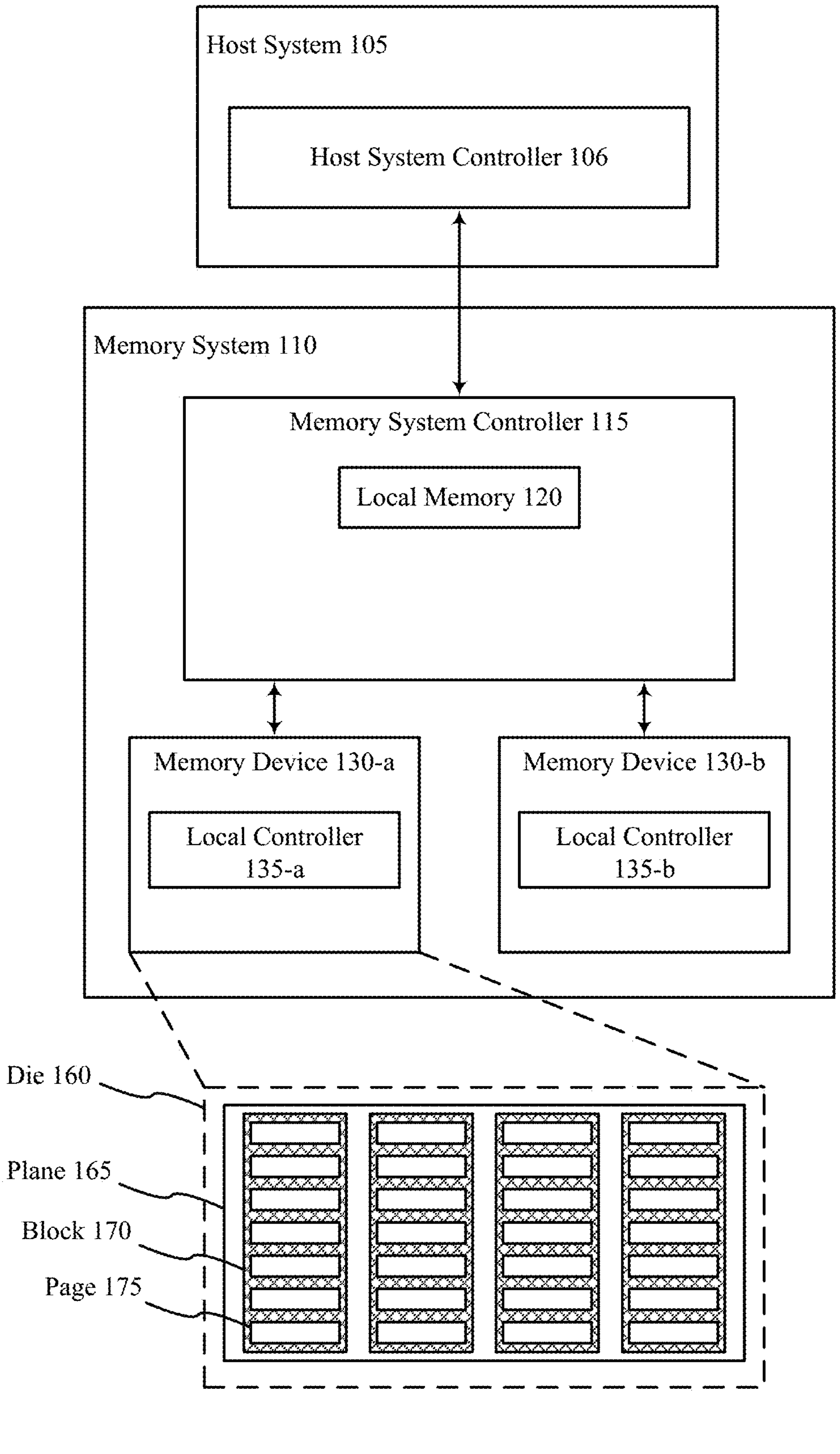
FIG. 1 illustrates an example of a system that supports data organization for logical to physical table compression in accordance with examples as disclosed herein.

Some memory systems use logical-to-physical (L2P) tables to map logical block addresses (LBAs) with physical addresses. The LBAs may be used by the host system to address stored data at a memory system, and the physical address may be used by the memory system to identify the corresponding physical location for the stored data. In some cases, the memory system may have a cache to store portions of the L2P table that are in use, and may use the portions of the L2P table in the cache when executing commands received from the host system. However, the cache may have a limited size. In some cases, a size limitation of the cache may cause increased overhead as regions of the L2P table may be frequently transferred from the memory medium (e.g., non-volatile storage) of the memory system to the cache. Frequently loading portions of the L2P table to the cache may decrease the overall performance of the memory system, thereby increasing the latency for other operations related to the host system (e.g., decreasing effective read, write, and erase speeds and efficiency). In addition, as the size of the L2P table increases, the size of the memory used for user data may be decreased. In such cases, techniques to reduce a size of the L2P table or a size of the portions of the L2P table stored in the cache may be desired.

Systems, devices, and techniques are described for compressing data stored by the L2P table of a memory system. Data stored by the L2P table may be compressed by organizing the data associated with a portion of the L2P table. For example, the memory system may rearrange logical address regions to correspond to continuous addresses of physical memory space. A region of logical addresses may be a candidate for rearranging if the region is full (e.g., each logical address of the region corresponds to a physical address) and has a high count of discontinuous (e.g., non-sequential) physical addresses. After the region is rearranged (e.g., the data written to a continuous region of physical addresses), the L2P table may be updated to store the first address of the region and an indicator that the region corresponds to a continuous range of physical addresses. In such cases, the cache may store the first address and the indicator in place of physical addresses for each logical address of the region, thereby consuming less space in the cache for the region and increasing a quantity of regions stored in the limited cache space. Increasing the quantity of regions stored in the cache may in turn reduce the amount of loading of regions from the L2P table to the cache.

Such techniques (e.g., compressing data stored by the L2P table via data organization) may increase the overall performance of the memory system, thereby decreasing the latency for other operations related to the host system. For example, rearranging discontinuous physical addresses to be within continuous addresses of physical memory space may reduce (e.g., compress) the size of the L2P table and improve the overall efficiency of the memory system, which may result in the memory system experiencing improved read, write, and erase speeds, reduced power consumption, improved processing times and the like.

Figure 2:
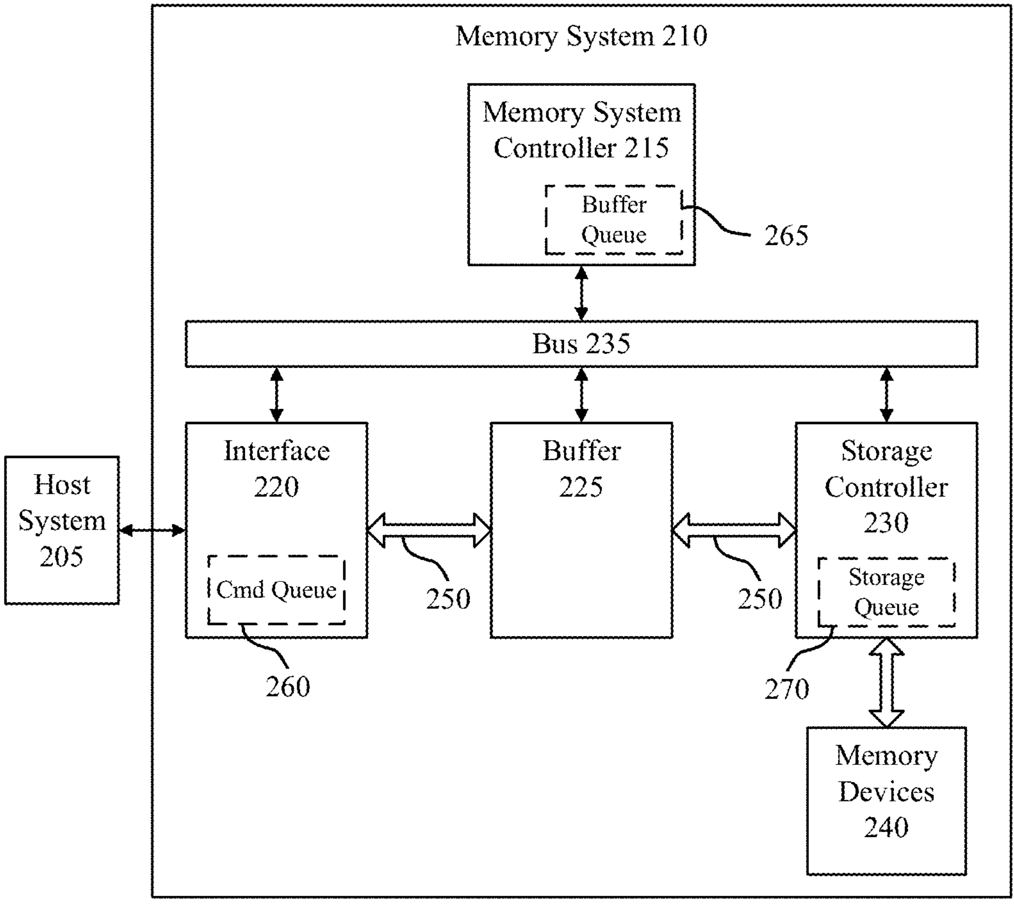
FIG. 2 illustrates an example of a system that supports data organization for logical to physical table compression in accordance with examples as disclosed herein.

Features of the disclosure are initially described in the context of systems, devices, and circuits with reference to FIGS. 1 through 2. Features of the disclosure are described in the context of a block diagram and process flow with reference to FIGS. 3-4. These and other features of the disclosure are further illustrated by and described in the context of an apparatus diagram and flowchart that relate to data organization for logical to physical table compression with reference to FIGS. 5-6.

FIG. 1 illustrates an example of a system 100 that supports data organization for logical to physical table compression in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support data organization for logical to physical table compression. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system 110 may include regions of logical addresses used for addressing by the host system 105 and memory cells arranged according to physical addresses. In such cases, the memory system 110 may identify a region of logical addresses having one or more logical addresses associated with discontinuous corresponding physical addresses. The memory system 110 may rearrange the data for the region to be within a continuous block of physical addresses during an idle time. For example, the memory system may determine a period of inactivity of access operations on the memory cells and rearrange, during the period of inactivity, information stored within the discontinuous corresponding physical addresses to be within continuous physical addresses.

FIG. 2 illustrates an example of a system 200 that supports data organization for logical to physical table compression in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, emerging memory may be used in place of other memory types such as NAND (e.g., flash). The memory system 210 may receive a command to access a logical block address of the memory device 240. The memory system 210 may identify a region of the memory system 210 that includes one or more logical block addresses associated with discontinuous physical addresses. For example, the memory system 210 may determine that the physical addresses may be discontinuous (e.g., non-sequential). The memory system 210 may flash the data included in the region to an open source block. In such cases, the memory system 210 may write data from one physical block to a different physical block where the data is written in a continuous manner, thereby rearranging the data to be continuous. The memory system 210 may access the physical address of the memory device 240.

Figure 3:
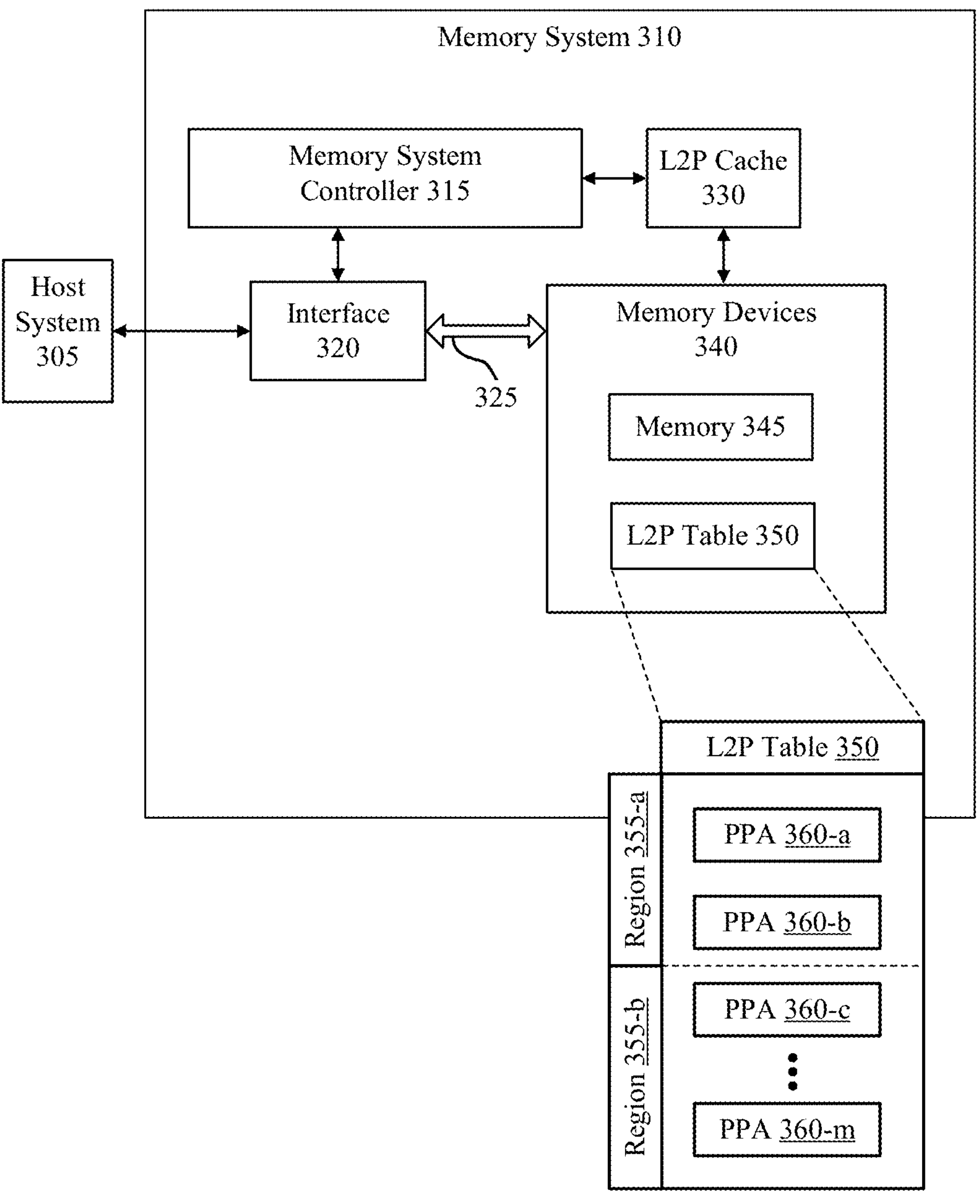
FIG. 3 illustrates an example of a block diagram that supports data organization for logical to physical table compression in accordance with examples as disclosed herein.

FIG. 3 illustrates an example of a block diagram 300 that supports data organization for logical to physical table compression in accordance with examples as disclosed herein. The block diagram 300 may include a host system 305, a memory system 310, a memory system controller 315, an interface 320, and memory device 340, which may be respective examples of a host system, memory system, memory system controller, interface, and memory device as described in reference to FIGS. 1-2. The memory system 310 may also include a L2P cache 330, a memory 345, and a L2P table 350. The L2P table 350 may include a mapping of physical addresses for each region 355. Each physical address may be referred to as a physical page address (PPA) 360.

The amount of storage available in the L2P cache 330 may be limited. For example, the L2P cache 330 may be unable to store the entire L2P table 350. When commands are received from the host system 305, the memory system 310 may load the region of the L2P table 350 corresponding to a logical address (or logical addresses) associated with the command from the memory device 340. Because the capacity of the L2P cache 330 is limited, the new region may overwrite a region that was previously loaded. Thus, as access commands are received from the host system 305, regions may frequently be loaded to overwrite other regions. Frequently loading regions from the L2P table 350 to the L2P cache 330 may increase the overhead in the memory system 310, thereby reducing the operating speeds and efficiency of the memory system 310.

To address these deficiencies, the memory system 310 may rearrange one or more regions of memory 345 such that a region of logical addresses corresponds to continuous physical addresses. Rearranging a region may also be called performing a flash operation on the region. The memory system 310 may organize the discontinuous physical addresses 360 to be continuous when the memory system 310 is in an idle mode (e.g., not receiving or executing access commands). For example, the data organization for the memory 345 and L2P table 350 may be performed as a background operation (e.g., while the memory system 310 is inactive). If the physical addresses 360 are discontinuous in the region 355, the memory system 310 may flash the data corresponding to the region to a different (e.g., currently unused) block of physical addresses 360. The physical addresses 360 for the region may be continuous after flashing the region data to the different block.

The memory system 310 may receive commands from the host system 305, via the interface 320, and write data to the memory 345. In some cases, the memory system 310 may maintain (e.g., update) the L2P table 350 based on writing data to the memory 345. The memory system 110 may retrieve portions of the L2P table 350 to store in the L2P cache 330 for use in response to updating the L2P table 350. In some examples, the memory system 310 may be unable to overwrite data in certain technologies (e.g., NAND), and thus may write data to a different physical address on a subsequent write to a same logical address.

The region 355 of logical addresses may correspond to discontinuous physical addresses 360. For example, the region 355-*a* may correspond to physical addresses 360-*a* and 360-*b* where physical address 360-*b* may be non-sequential with physical address 360-*a*. The region 355-*b* may correspond to physical addresses 360-*c* through physical address 360-*m*. Discontinuous physical addresses may be an example of non-sequential physical addresses. For example, discontinuous physical addresses may correspond to a pattern of random physical addresses accessed as part of a plurality of read commands.

In some cases, the entire LBA address space may be divided into smaller regions 355 to be managed by the memory system 310. For example, the memory system 310 may split the address space into region 355-*a* and 355-*b* (and additional regions). In some examples, the memory system 310 may identify that the region 355-*a* has one or more logical addresses associated with discontinuous physical addresses 360 (e.g., including physical address 360-*a* and 360-*b*).

The memory system 310 may rearrange (e.g., flash) information stored within the discontinuous physical addresses 360 to be within continuous physical addresses 360 based on identifying that the region 355 includes discontinuous physical addresses 360. The memory system 310 may determine which regions 355 are to be rearranged based on read counts, how full the region 355 is, a level of discontinuity, a write amplify, other factors, or a combination thereof.

In some cases, the memory system 310 may determine which regions 355 are to be rearranged based on read counts. For example, the memory system 310 may rearrange the region 355 if the region 355 has a read hit count that satisfies (e.g., is greater than, or equal to or greater than) a threshold quantity. The memory system 310 may refrain from rearranging the region 355 if the region 355 has a read hit count that does not satisfy the threshold quantity. The read count may be an example of a quantity of read operations performed on the memory cells of the memory system 310.

In some examples, the memory system 310 may select the target region 355 (including the discontinuous physical addresses 360). The target region 355 may be selected based on the region 355 being full and including discontinuous physical addresses 360. A full region 355 may be an example of a region 355 where all the logical addresses are in use. In some cases, the memory system 310 may also rearrange regions that have more than a threshold amount of logical addresses that are in use.

The memory system 310 may determine which regions 355 are to be rearranged based on the level of discontinuity. For example, the memory system 310 may determine that a quantity of physical addresses 360 of the region that are not continuous is above a threshold to determine that the physical addresses 360 are discontinuous. Physical addresses that are not continuous may be referred to as random, and a random value may be assigned to a region based on the number of random addresses. In such cases, the physical addresses 360 for a region may indicate a high random value. A high random value may be a quantity of random addresses that satisfies (e.g., is greater than, is greater than or equal to) a threshold. The memory system 310 may determine that a quantity of physical addresses 360 that are random does not satisfy the threshold. In such cases, the physical addresses 360 may include no random addresses, or a quantity of random addresses that does not satisfy the threshold. The maximum random value for a region having 1,024 PPAs may be 1,024. If the random value is 1,024, the region 355 may be an example of a fully random region 355 (e.g., that each physical address 360 is discontinuous). If the random value is 0, the region 355 may be an example of a region 355 containing continuous physical addresses 360.

The memory system 310 may determine which regions 355 are to be rearranged based on a write amplify. For example, the memory system 310 may determine the write amplify according to a quantity of access commands received from host system 305 and a quantity of write operations that have been performed. For example, the host system 305 may transmit commands (e.g., over time) indicating requests for the memory to write 1 GB of data. The memory 345 may write 2 GB of data as a result of the commands (e.g., due to background operations such as garbage collection or folding of data from single bit cells to cells that store multiple bits of data), thereby resulting in a write amplify of 2.

In some cases, the memory system 310 may determine that the write amplify does not satisfy (e.g., is less than, is less than or equal to) a threshold of write amplify, and determine that the region 355 includes discontinuous physical addresses 360. In other examples, the memory system 310 may determine that the write amplify satisfies (e.g., is greater than, is greater than or equal to) a threshold of write amplify. For example, if the write amplify is a value that satisfies the threshold (e.g., 2, 3, 6, etc.), the region 355 may have been erased a high quantity of times, thus, the memory system 310 may refrain from rearranging the data is it would further increase the write amplify.

The memory system 310 may determine which regions 355 are to be rearranged based on a type of data. For example, the memory system may determine whether the data is hot or cold. If the data is determined to be hot, the memory system 310 may determine that the region 355 is seeing a high volume of read operations over a given amount of time (e.g., a quantity of read operations on the region satisfies a threshold). If the data is determined to be cold, the memory system 310 may determine that the region 355 is not seeing a high volume of read operations over the given amount of time (e.g., the quantity of read operations does not satisfy the threshold).

In some cases, the memory system 310 may determine which regions 355 are to be rearranged based on a combination of factors. For example, if the random value of the physical addresses is 1,024 (or close to 1,024) for a region size of 1,024, the data is hot data, and the write amplify does not satisfy (e.g., is less than, or less than or equal to) the threshold, then the memory system 310 may determine that the region 355 is to be rearranged. In some case, the memory system 310 may use a table to determine which regions 355 are to be rearranged by recording each of the factors in the table and determining whether an overall threshold to rearrange the physical addresses 360 is met (e.g., exceeded). In some cases, the determining factors may be based on a priority. For example, if the has a high random value but is cold, the memory 345 may refraining from rearranging the region. In such cases, the data may include a lower priority to rearrange. In some examples, the memory system 310 may apply different thresholds to one or both of the random value and the quantity of read operations based on different values of the write amplify. For example, if the write amplify is below a first threshold, the memory system 310 may rearrange the region if one or both of the random value and the quantity of read operations satisfy respective first thresholds. If the write amplify is above the first threshold but below a second threshold the memory system 310 may rearrange the region if one or both of the random value and the quantity of read operations satisfy respective second thresholds. If the write amplify is above the second threshold the memory system 310 may rearrange the region if one or both of the random value and the quantity of read operations satisfy respective third thresholds. Although this example describes two thresholds for the write amplify, additional thresholds may be used. Additionally or alternatively, factors may be applied to the write amplify, the random value, and/or the quantity of read operations such that the memory system 310 may rearrange the region if a function of the write amplify, the random value, and/or the quantity of read operations, with the respective factors applied, satisfies a threshold.

Based on identifying the region 355 that satisfies the one or more thresholds as discussed above, the memory system 310 may flash the region 355. The flash operation may be an example of rearranging information stored within the discontinuous corresponding physical addresses to be within continuous physical addresses. For example, the memory system 310 may flash the target (e.g., identified) region 355 to an open block of the memory system 310. In direct response to flashing the region 355, the region 355 may covert the discontinuous physical addresses 360 to be continuous physical addresses 360. That is, the data may be read from each of the discontinuous physical addresses indicated in the L2P table 350 and rewritten to a set of continuous physical addresses. The memory system 310 may determine that the region 355 includes continuous physical addresses 360 based on rearranging the region 355.

In some cases, rearranging the region 355 may include performing an overwrite operation. The overwrite operation may be an example of reading the data into memory 345, erasing the block of data, and writing the read data to the same block. In some examples, performing the flash operation may be an example of moving the data from one or more physical blocks to a different physical block. Continuous physical addresses 360 may be an example of sequential physical addresses 360. For example, the physical addresses may be adjacent to each other (e.g., include a location such as a location proximate to, directly or immediately next to, among other things). In some examples, continuous physical addresses 360 may correspond to a pattern of physical addresses accessed sequentially (e.g., one after the other) as part of a plurality of read commands.

The memory system 310 may rearrange the information stored within the discontinuous corresponding physical addresses 360 during a period of inactivity. For example, the memory system 310 may determine the period of inactivity of access operations on the memory cells of memory system 310 and flash the identified region during the period of inactivity. The period of inactivity may be an example of a sleep mode, a low power mode, or an idle mode. In some examples, the memory system 310 may rearrange the information overnight if the memory system 310 is inactive. In such cases, the memory system 310 may not receive commands from the host system 305 during the period of inactivity to minimize the overall performance impact of the flash operation to the memory system 310.

In some cases, the L2P table 350 and/or the L2P cache 330 may store relevant information for a region 355 that has been rearranged. For example, the L2P table may store a first physical address (e.g., physical address 360-*a*) and some indicator that the region 355 of logical addresses corresponds to continuous physical addresses 360. A portion (e.g., a representation of) the L2P table 350 may be uploaded to the L2P cache 330 in response to receiving a command to access a logical block address of the region 355. The portion of the L2P table 350 may include the first physical address and exclude additional physical addresses 360 of the continuous physical addresses 360 corresponding to the region 355. In such cases, the L2P cache 330 may store a reduced amount of data rather than the entire quantity of addresses in the region 355 of the L2P table 350, thereby increasing the efficiency and operations of the memory system 310.

The memory system 310 may compress (e.g., reduce a size of) the L2P table 350 by storing the first physical address and the indicator. After the discontinuous physical addresses 360 may be rearranged, the L2P table 350 may only store the first physical address as the physical addresses 360 are continuous. The indicator may indicate that the physical address 360-*a* may be the first physical address in a continuous region of physical addresses 360. The indicator may also signal to the memory system 310 to store only a portion of the L2P table 350 in the L2P cache 330. The L2P cache 330 may be limited in size, thus storing the portion of the L2P table 350 may increase an amount of additional data that may be written in the available portion of the L2P cache 330. The L2P cache 330 may be an example of SRAM. If the physical addresses 360 are discontinuous, each physical address 360 of the region 355 may be stored in the L2P table 350 and loaded into the L2P cache 330, thereby increasing the overhead and decreasing an amount of available storage in the L2P cache 330.

The L2P table 350 may be stored in the memory device 340. In some examples, portions (e.g., regions 355) of the L2P table 350 may be read from the memory device 340 and stored in the L2P cache 330 to be used by the memory system controller 315 upon receiving commands associated with logical addresses within the regions 355. That is, if a command is received for a logical address within a region 355, the region 355 may be loaded into the L2P cache 330. The memory system controller 315 may store portions of the L2P table 350 within the memory system 310. In some cases, the L2P table 350 may map logical block addresses to physical addresses 360. The L2P table may be mapped to continuous blocks of the memory device 340 (e.g., the locations storing each PPA 360 for a region may be a continuous block of physical addresses of the memory device 340. The L2P table 350 may be divided into one or more regions 355 (e.g., regions 355-*a* and 355-*b*) where the physical addresses 360 may be indexed by the region 355. The L2P table 350 may store the physical addresses 360 that correspond to the logical block address.

Rearranging information stored within the discontinuous corresponding physical addresses to be within continuous physical addresses and storing the first physical address 360-*a* in the L2P table 350 may allow the L2P table 350 to store increased amounts of data, thereby storing a larger region of corresponding logical block addresses and improving read performance. Compressing the L2P table 350 by storing the first physical addresses and an indication that the region of physical addresses is continuous may reduce operation latency and improve the overall operations of the memory system (e.g., overwrite operation, garbage collection operation, etc.) as the L2P table compression 350 may enable the memory system 310 to update data less frequently in response to the memory operations.

Figure 4:
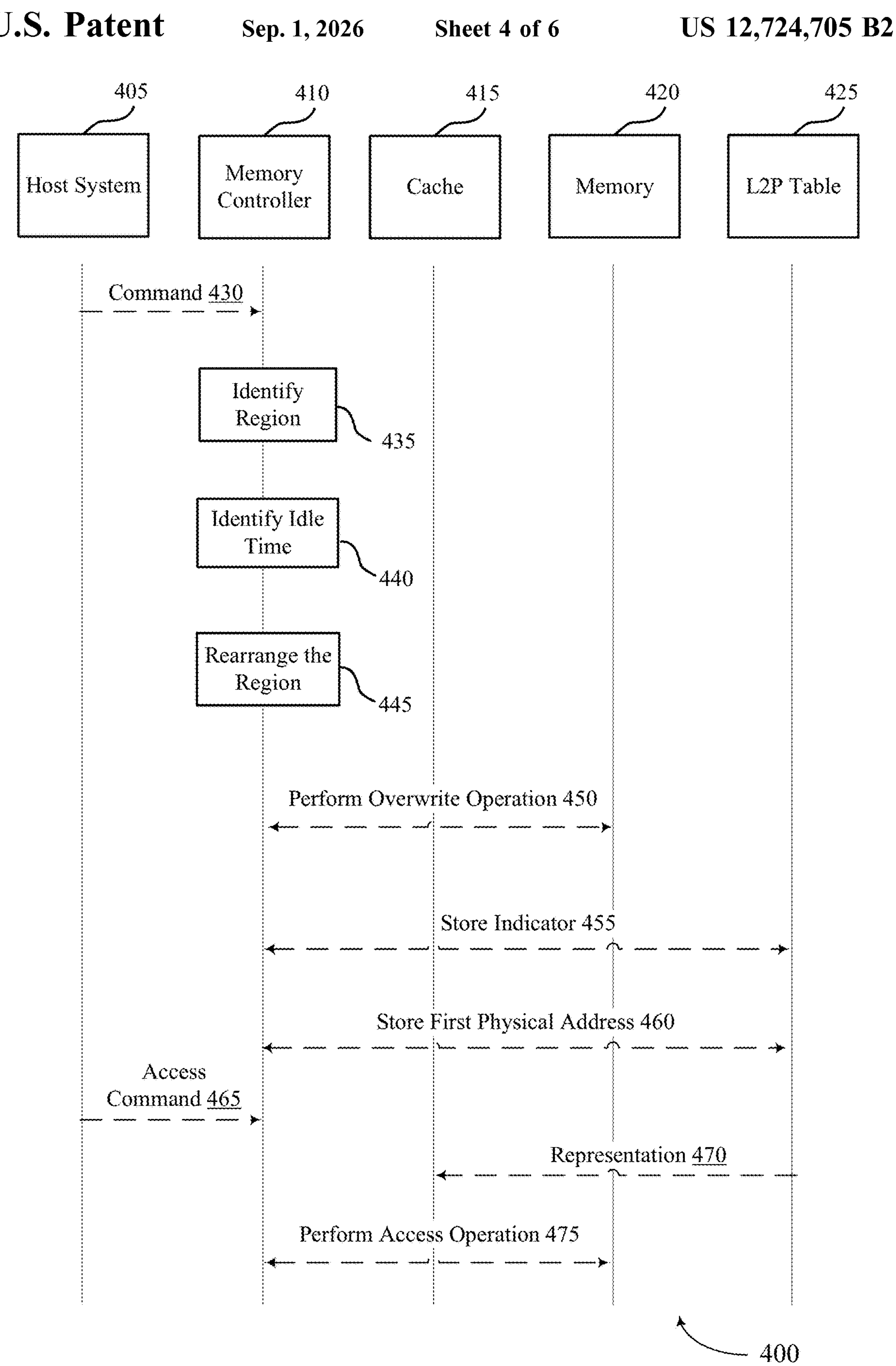
FIG. 4 illustrates an example of a flow diagram that supports data organization for logical to physical table compression in accordance with examples as disclosed herein.

FIG. 4 illustrates an example of a flow diagram 400 that supports data organization for logical to physical table compression in accordance with examples as disclosed herein. Flow diagram 400 may include host system 405, memory controller 410, cache 415, memory 420, and L2P table 425, which may be respective examples of a host system, memory system, L2P cache, memory, and L2P table as described in reference to FIGS. 1-3. Alternative examples of the following may be implemented, where some steps are performed in a different order or not at all. Some steps may additionally include additional features not mentioned below. The flow diagram 400 illustrates techniques where a memory controller 410 may rearrange data for regions of logical addresses with discontinuous physical addresses, thereby organizing data for L2P table compression.

Aspects of the flow diagram 400 may be implemented by a controller, among other components. Additionally or alternatively, aspects of the flow diagram 400 may be implemented as instructions stored in memory (e.g., firmware stored in a memory coupled with the memory system 210). For example, the instructions, when executed by a controller (e.g., the memory system controller 115), may cause the controller to perform the operations of the flow diagram 400.

At 430, a command may be received. For example, the host system 405 may transmit the command to the memory controller 410 or a memory system including the memory controller 410, the cache 415, the memory 420, and the L2P table 425. The memory controller 410 may receive the command from the host system 405 and write data to a memory medium (e.g., memory 420). In some cases, the memory controller 410 may receive a command to access a logical block address in the region. In some cases, the command may be an example of a write command. In such cases, the memory system may access the L2P table 425 (e.g., load the region of the L2P table to the cache 415), determine a physical address (from the cache 415), and write the data to a different physical address. The memory system may update the L2P table 425 with the new physical address.

At 435, a region may be identified. For example, the memory controller 410 may identify a region having one or more logical addresses associated with discontinuous corresponding physical addresses. In such cases, the memory controller 410 may identify a region of logical addresses that are associated with a portion of physical addresses that are discontinuous (e.g., nonsequential). The memory system may include regions of logical addresses and memory cells arranged according to physical addresses.

In some cases, the memory controller 410 may determine whether a quantity of the one or more logical addresses associated with the discontinuous corresponding physical addresses satisfies a threshold. For example, the memory controller 410 may determine that the logical block addresses are associated with discontinuous corresponding physical addresses based on the corresponding physical addresses including a high random value. In such cases, the random value may be above a threshold random value. The high random value may indicate that the corresponding physical addresses may be discontinuous (e.g., random, non-sequential).

In some examples, the memory controller 410 may identify a second region having the one or more logical addresses associated with the discontinuous corresponding physical addresses. For example, the memory controller 410 may determine that a write amplify factor is less than a threshold for the discontinuous corresponding physical addresses. In such cases, the memory controller 410 may identify the region based on a low write amplify factor.

The memory controller 410 may determine whether a read count for the region satisfies a threshold in response to identifying the region. For example, the memory controller 410 may determine that data associated with the region is hot (e.g., has a quantity of reads within a given amount of time that satisfies a threshold). In such cases, the memory controller 410 may identify the region based on determining that the data is hot.

The memory controller 410 may determine whether the region having the one or more logical addresses associated with the discontinuous corresponding physical addresses is occupied in direct response to identifying the region. For example, the memory controller 410 may identify the region based on determining that the region is full (e.g., having a quantity of address that are occupied satisfying a threshold) and discontinuous.

At 440, an idle time may be identified. For example, the memory controller 410 may identify an idle time. The memory controller 410 may determine a period of inactivity of access operations on memory cells in response to identifying the region and determining that the corresponding physical addresses are discontinuous.

At 445, the region may be rearranged. For example, the memory controller 410 may rearrange, during the period of inactivity, information stored within the discontinuous corresponding physical addresses to be within continuous physical addresses. To rearrange the information the memory controller may read the information from the discontinuous corresponding physical addresses of the memory 420 and write it back to continuous physical addresses of the memory 420. In such cases, the memory controller 410 may rearrange the discontinuous physical addresses to be a continuous range of physical addresses during the idle period. The rearranging may be based on determining that the read count satisfies the threshold, determining that a write amplify factor does not satisfy a threshold, determining that the physical addresses include a high random value, selecting the region, or a combination thereof.

In some cases, the memory controller 410 may suppress rearranging information stored within the discontinuous corresponding physical addresses associated with the second region based on determining that a write amplify factor satisfies a threshold. In such cases, the write amplify factor may be greater than, or greater than or equal to the threshold, and the memory controller 410 may refrain from rearranging the region.

At 450, the memory controller 410 may perform operations 446 to move the data (e.g., read the data associated with the discontinuous physical addresses and write the data associated with the logical addresses of the region to continuous corresponding physical addresses. The write operation may occur in response to (e.g., after) reading the data.

The memory controller 410 may also perform operations 447 to update the L2P table 425. For example, the memory controller 410 may store a first physical address of the continuous physical addresses to a first location within the L2P table for the region. Updating the L2P table using operations 447 may also include storing an indicator in the L2P table 425 that the region corresponds to a continuous region of physical addresses. The indicator may indicate that the information stored within the discontinuous corresponding physical addresses is rearranged to be within the continuous physical addresses based on rearranging the information. In such cases, the stored indicator may identify that the corresponding physical addresses are continuous (e.g., sequential). In such cases, the L2P table 425 may be compressed (e.g., reduced in size) by storing the first physical address and the indicator to indicate that the following physical addresses after the first are sequential (e.g., continuous). For example, for a region size of 1,024 physical addresses, the L2P table 425 may need to store only one address and the indicator, instead of 1,024 separate addresses. Alternatively, the L2P table 425 may store each of the continuous physical addresses for the region. This may allow easier updating of the L2P table 425 when a write operation to a logical address within the region is performed (e.g., the rest of the region of the L2P table may not also need to be updated).

At 465, an access command may be received. For example, the host system 405 may transmit the access command to the memory controller 410 or the memory 420. The memory controller 410 may receive the access command from the host system 405. In some cases, the memory controller 410 may receive the access command to access a logical block address in the region. The access command may be a read command associated with the region that has been rearranged to correspond to continuous physical addresses.

At 465, the command may be executed. Executing the command may include transmission of a representation 470 of the L2P table 425 for the region from the L2P table 425 to the cache 415. The representation 470 may be an example of a portion of the L2P table 425 including the first physical address and the indicator and excluding additional physical addresses of the continuous physical addresses corresponding to the region, thereby reducing a size of the representation 470. The memory system may refrain from transmitting the entire region of the L2P table 425 due to the presence of the indicator and the first physical address.

The cache 415 may load (e.g., store) the representation 470 of the L2P table 425 for the region in response to receiving the access command and the representation. The cache 415 may be associated with the L2P table 425 of the memory system. The cache 415 may store a portion of the L2P table 425 in a shared or local memory (e.g., SRAM), thereby increasing an amount of space available in the cache 415 due to the reduction of size for the region of the L2P table 425. The cache 415 may load only the first physical address due to the physical addresses being continuous after the rearranging. In such cases, the memory system may identify, at 472, the first physical address and the remaining additional physical addresses that follow the first physical address without including the additional physical addresses in the cache 415.

At 475, the execution of the command may include reading the data from one or more of the continuous physical addresses corresponding to the logical addresses that are associated with the command. The memory controller 410 may send the data to the host 405 to complete execution of the command.

Figure 5:
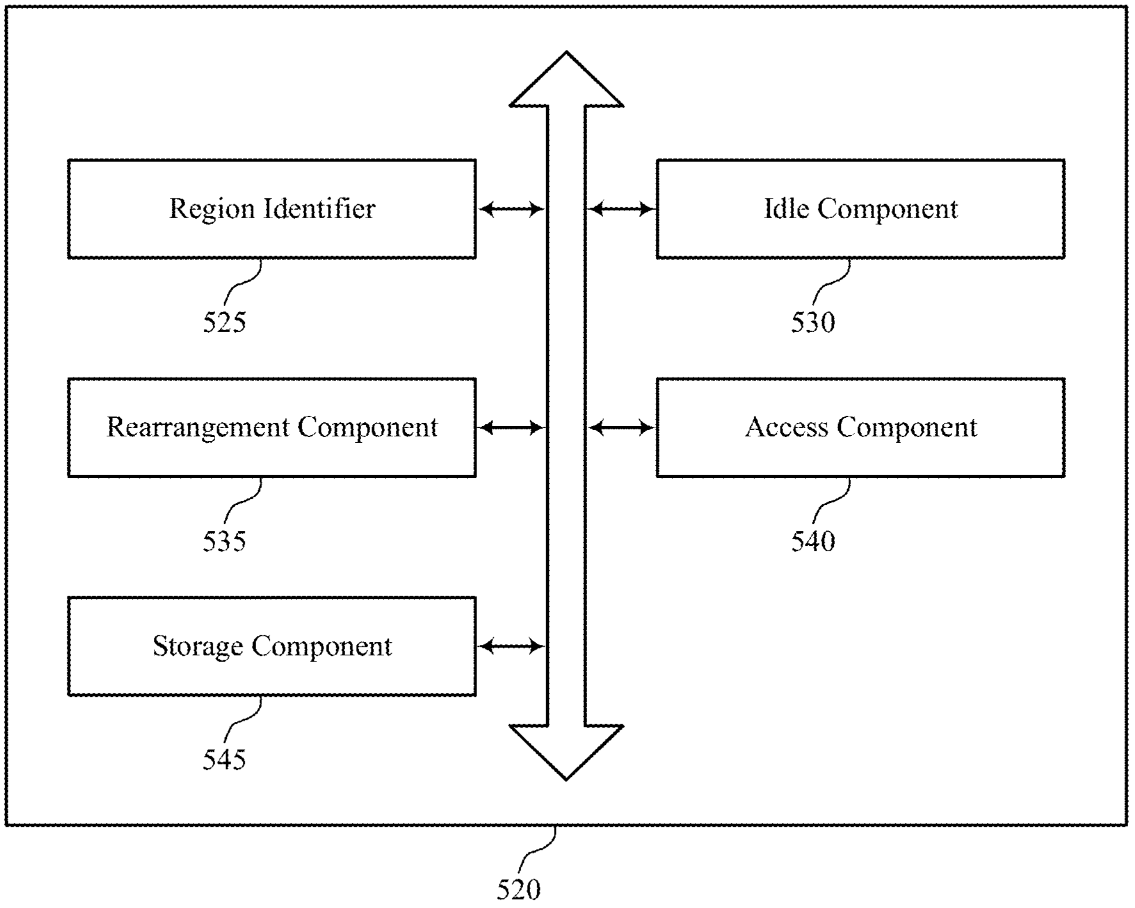
FIG. 5 shows a block diagram of a managed memory system controller that supports data organization for logical to physical table compression in accordance with examples as disclosed herein.

FIG. 5 shows a block diagram 500 of a managed memory system controller 520 that supports data organization for logical to physical table compression in accordance with examples as disclosed herein. The managed memory system controller 520 may be an example of aspects of a managed memory system controller as described with reference to FIGS. 1 through 4. The managed memory system controller 520, or various components thereof, may be an example of means for performing various aspects of data organization for logical to physical table compression as described herein. For example, the managed memory system controller 520 may include a region identifier 525, an idle component 530, a rearrangement component 535, an access component 540, a storage component 545, or any combination thereof. Each of these components may communicate, directly or indirectly, with one another (e.g., via one or more buses).

The region identifier 525 may be configured as or otherwise support a means for identifying, for a memory system including a plurality of regions of logical addresses and a plurality of memory cells arranged according to a plurality of physical addresses, a region of the plurality of regions having one or more logical addresses associated with discontinuous corresponding physical addresses of the plurality of physical addresses. The idle component 530 may be configured as or otherwise support a means for determining a period of inactivity of access operations on the plurality of memory cells. The rearrangement component 535 may be configured as or otherwise support a means for rearranging, during the period of inactivity, information stored within the discontinuous corresponding physical addresses to be within continuous physical addresses of the plurality of physical addresses.

In some examples, to support identifying the region, the region identifier 525 may be configured as or otherwise support a means for determining whether a quantity of the one or more logical addresses associated with the discontinuous corresponding physical addresses satisfies a threshold.

In some examples, the region identifier 525 may be configured as or otherwise support a means for identifying a second region of the plurality of regions having the one or more logical addresses associated with the discontinuous corresponding physical addresses of the plurality of physical addresses. In some examples, the rearrangement component 535 may be configured as or otherwise support a means for suppressing rearranging information stored within the discontinuous corresponding physical addresses associated with the second region based at least in part on determining that a write amplify factor satisfies a threshold.

In some examples, the access component 540 may be configured as or otherwise support a means for determining whether a read count for the region satisfies a threshold based at least in part on identifying the region, where rearranging the information is based at least in part on determining that the read count satisfies the threshold.

In some examples, to support rearranging the information, the access component 540 may be configured as or otherwise support a means for reading the data associated with the plurality of physical addresses. In some examples, to support rearranging the information, the access component 540 may be configured as or otherwise support a means for writing the data associated with the plurality of physical addresses to a second region of the plurality of regions having the one or more logical addresses associated with continuous corresponding physical addresses of the plurality of physical addresses based at least in part on reading the data, where rearranging the information is based at least in part on reading the data and writing the data.

In some examples, the storage component 545 may be configured as or otherwise support a means for storing a first physical address of the plurality of physical addresses in a logical-to-physical table of the memory system based at least in part on rearranging the information.

In some examples, the storage component 545 may be configured as or otherwise support a means for storing an indicator, in a logical-to-physical table of the memory system, that the information stored within the discontinuous corresponding physical addresses is rearranged to be within the continuous physical addresses based at least in part on rearranging the information.

In some examples, the access component 540 may be configured as or otherwise support a means for receiving a command to access a logical block address in the region. In some examples, the storage component 545 may be configured as or otherwise support a means for loading, in a cache associated with a logical-to-physical table, a representation of the logical-to-physical table for the region based at least in part on receiving the command, where the representation includes a first physical address and excludes additional physical addresses of the continuous physical addresses corresponding to the region.

In some examples, the region identifier 525 may be configured as or otherwise support a means for determining whether the region having the one or more logical addresses associated with the discontinuous corresponding physical addresses of the plurality of physical addresses is occupied based at least in part on identifying the region. In some examples, the region identifier 525 may be configured as or otherwise support a means for selecting the region based at least in part on determining that the region is occupied, where rearranging the information is based at least in part on selecting the region.

Figure 6:
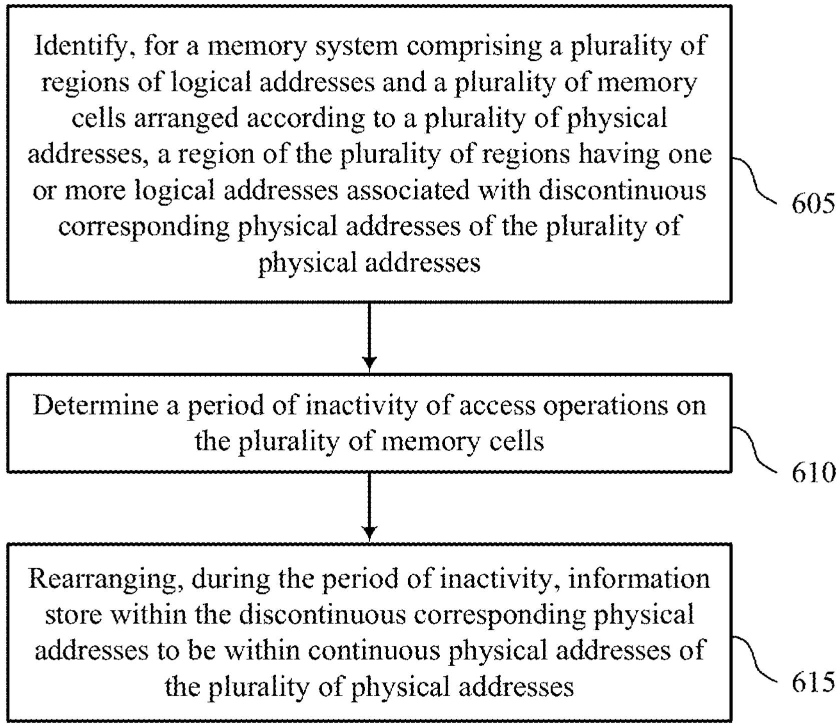
FIG. 6 shows a flowchart illustrating a method or methods that support data organization for logical to physical table compression in accordance with examples as disclosed herein.

FIG. 6 shows a flowchart illustrating a method 600 that supports data organization for logical to physical table compression in accordance with examples as disclosed herein. The operations of method 600 may be implemented by a managed memory system controller or its components as described herein. For example, the operations of method 600 may be performed by a managed memory system controller as described with reference to FIGS. 1 through 5. In some examples, a managed memory system controller may execute a set of instructions to control the functional elements of the device to perform the described functions. Additionally or alternatively, the managed memory system controller may perform aspects of the described functions using special-purpose hardware.

At 605, a region may be identified. For example, the method may include identifying, for a memory system including a plurality of regions of logical addresses and a plurality of memory cells arranged according to a plurality of physical addresses, a region of the plurality of regions having one or more logical addresses associated with discontinuous corresponding physical addresses of the plurality of physical addresses. The operations of 605 may be performed in accordance with examples as disclosed herein. In some examples, aspects of the operations of 605 may be performed by a region identifier 525 as described with reference to FIG. 5.

At 610, a period of inactivity may be determined. For example, the method may include determining a period of inactivity of access operations on the plurality of memory cells. The operations of 610 may be performed in accordance with examples as disclosed herein. In some examples, aspects of the operations of 610 may be performed by an idle component 530 as described with reference to FIG. 5.

At 615, information may be rearranged. For example, the method may include rearranging, during the period of inactivity, information stored within the discontinuous corresponding physical addresses to be within continuous physical addresses of the plurality of physical addresses. The operations of 615 may be performed in accordance with examples as disclosed herein. In some examples, aspects of the operations of 615 may be performed by a rearrangement component 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for identifying, for a memory system including a plurality of regions of logical addresses and a plurality of memory cells arranged according to a plurality of physical addresses, a region of the plurality of regions having one or more logical addresses associated with discontinuous corresponding physical addresses of the plurality of physical addresses, determining a period of inactivity of access operations on the plurality of memory cells, and rearranging, during the period of inactivity, information stored within the discontinuous corresponding physical addresses to be within continuous physical addresses of the plurality of physical addresses.

In some examples of the method 600 and the apparatus described herein, identifying the region may include operations, features, circuitry, logic, means, or instructions for determining whether a quantity of the one or more logical addresses associated with the discontinuous corresponding physical addresses satisfies a threshold.

Some examples of the method 600 and the apparatus described herein may further include operations, features, circuitry, logic, means, or instructions for identifying a second region of the plurality of regions having the one or more logical addresses associated with the discontinuous corresponding physical addresses of the plurality of physical addresses and suppressing rearranging information stored within the discontinuous corresponding physical addresses associated with the second region based at least in part on determining that a write amplify factor satisfies a threshold.

Some examples of the method 600 and the apparatus described herein may further include operations, features, circuitry, logic, means, or instructions for determining whether a read count for the region satisfies a threshold based at least in part on identifying the region, where rearranging the information may be based at least in part on determining that the read count satisfies the threshold.

In some examples of the method 600 and the apparatus described herein, rearranging the information may include operations, features, circuitry, logic, means, or instructions for reading the data associated with the plurality of physical addresses and writing the data associated with the plurality of physical addresses to a second region of the plurality of regions having the one or more logical addresses associated with continuous corresponding physical addresses of the plurality of physical addresses based at least in part on reading the data, where rearranging the information may be based at least in part on reading the data and writing the data.

Some examples of the method 600 and the apparatus described herein may further include operations, features, circuitry, logic, means, or instructions for storing a first physical address of the plurality of physical addresses in a logical-to-physical table of the memory system based at least in part on rearranging the information.

Some examples of the method 600 and the apparatus described herein may further include operations, features, circuitry, logic, means, or instructions for storing an indicator, in a logical-to-physical table of the memory system, that the information stored within the discontinuous corresponding physical addresses may be rearranged to be within the continuous physical addresses based at least in part on rearranging the information.

Some examples of the method 600 and the apparatus described herein may further include operations, features, circuitry, logic, means, or instructions for receiving a command to access a logical block address in the region and loading, in a cache associated with a logical-to-physical table, a representation of the logical-to-physical table for the region based at least in part on receiving the command, where the representation includes a first physical address and excludes additional physical addresses of the continuous physical addresses corresponding to the region.

Some examples of the method 600 and the apparatus described herein may further include operations, features, circuitry, logic, means, or instructions for determining whether the region having the one or more logical addresses associated with the discontinuous corresponding physical addresses of the plurality of physical addresses may be occupied based at least in part on identifying the region and selecting the region based at least in part on determining that the region may be occupied, where rearranging the information may be based at least in part on selecting the region.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

identify, within the memory system, a region having one or more logical addresses associated with discontinuous corresponding physical addresses in response to a quantity of the one or more logical addresses associated with the discontinuous corresponding physical addresses satisfying a threshold; and rearrange, during a period of inactivity of access operations associated with the memory system, information stored within the discontinuous corresponding physical addresses to be within continuous physical addresses of the memory system.

2. The memory system of claim 1, wherein the processing circuitry is further configured to cause the memory system to:

record a value of each factor of a plurality of factors associated with the region of the memory system, the plurality of factors including the quantity of the one or more logical addresses, wherein the region is identified in response to the value of one or more factors of the plurality of factors satisfying one or more corresponding thresholds.

3. The memory system of claim 2, wherein the plurality of factors further comprise a write amplify factor associated with the region, a read count for the region, or both.

4. The memory system of claim 3, wherein the processing circuitry is further configured to cause the memory system to:

set a first threshold for a first factor of the plurality of factors in accordance with the value of the write amplify factor.

5. The memory system of claim 2, wherein the value of a first factor of the plurality of factors satisfies a first threshold and the value of a second factor of the plurality of factors fails to satisfy a second threshold, wherein the region is identified in response to the value of the first factor satisfying the first threshold in accordance with a second priority of the second factor being lower than a first priority of the first factor.

6. The memory system of claim 1, wherein the processing circuitry is further configured to cause the memory system to:

identify a second region of the memory system having one or more second logical addresses associated with the discontinuous corresponding physical addresses; and suppress rearranging information stored within the discontinuous corresponding physical addresses associated with the second region in response to determining that a write amplify factor fails to satisfy a second threshold.

7. The memory system of claim 1, wherein the processing circuitry is further configured to cause the memory system to:

determine whether a read count for the region satisfies a second threshold in response to identifying the region, wherein the information is rearranged in response to determining that the read count satisfies the second threshold.

8. The memory system of claim 1, wherein, to rearrange the information, the processing circuitry is configured to cause the memory system to:

read data associated with a plurality of physical addresses that comprise the discontinuous corresponding physical addresses; and write the data associated with the plurality of physical addresses to a second region of the memory system having the one or more logical addresses associated with continuous corresponding physical addresses of the plurality of physical addresses in response to reading the data, wherein the information is rearranged in response to reading the data and writing the data.

9. The memory system of claim 1, wherein the processing circuitry is further configured to cause the memory system to:

store a first physical address in a logical-to-physical table of the memory system in response to rearranging the information.

10. The memory system of claim 1, wherein the processing circuitry is further configured to cause the memory system to:

store an indicator, in a logical-to-physical table of the memory system, that the information stored within the discontinuous corresponding physical addresses is rearranged to be within the continuous physical addresses in response to rearranging the information.

11. The memory system of claim 1, wherein the processing circuitry is further configured to cause the memory system to:

receive a command to access a logical block address in the region; and load, in a cache associated with a logical-to-physical table, a representation of the logical-to-physical table for the region in response to receiving the command, wherein the representation includes a first physical address and excludes additional physical addresses of the continuous physical addresses corresponding to the region.

12. The memory system of claim 1, wherein the processing circuitry is further configured to cause the memory system to:

determine whether the region having the one or more logical addresses associated with the discontinuous corresponding physical addresses is occupied in response to identifying the region; and select the region in response to determining that the region is occupied, wherein the information is rearranged in response to selecting the region.

13. A memory system, comprising:

one or more memory devices; and processing circuitry coupled with the one or more memory devices and configured to cause the memory system to:

identify, within the memory system, a region having one or more logical addresses associated with discontinuous corresponding physical addresses in response to a quantity of the one or more logical addresses associated with the discontinuous corresponding physical addresses satisfying a first threshold; and rearrange, in accordance with a value of a write amplify factor associated with the region of the memory system failing to satisfy a second threshold, information stored within the discontinuous corresponding physical addresses to be within continuous physical addresses of the memory system.

14. The memory system of claim 13, wherein the processing circuitry is further configured to cause the memory system to:

record the value of the write amplify factor, wherein the region is identified in response to the value of the write amplify factor failing to satisfy the second threshold.

15. The memory system of claim 14, wherein the processing circuitry is further configured to cause the memory system to:

set the first threshold in accordance with the value of the write amplify factor.

16. The memory system of claim 13, wherein the processing circuitry is further configured to cause the memory system to:

identify a second region of the memory system having one or more second logical addresses associated with the discontinuous corresponding physical addresses; and suppress rearranging information stored within the discontinuous corresponding physical addresses associated with the second region in response to determining that a second write amplify factor associated with the second region fails to satisfy a third threshold.

17. A method, comprising:

identifying, within a memory system, a region having one or more logical addresses associated with discontinuous corresponding physical addresses in response to a quantity of the one or more logical addresses associated with the discontinuous corresponding physical addresses satisfying a threshold; and rearranging, during a period of inactivity of access operations associated with the memory system, information stored within the discontinuous corresponding physical addresses to be within continuous physical addresses of the memory system.

18. The method of claim 17, further comprising:

recording a value of each factor of a plurality of factors associated with the region of the memory system, the plurality of factors including the quantity of the one or more logical addresses, wherein the region is identified in response to the value of one or more factors of the plurality of factors satisfying one or more corresponding thresholds.

19. The method of claim 18, wherein the plurality of factors further comprise a write amplify factor associated with the region, a read count for the region, or both.

20. The method of claim 19, further comprising:

setting a first threshold for a first factor of the plurality of factors in accordance with the value of the write amplify factor.

* * * * *